United States Patent
Marioni

(10) Patent No.: US 9,381,970 B2
(45) Date of Patent: Jul. 5, 2016

(54) ELECTRIC PROPULSION UNIT AND TORQUE TRANSMISSION GROUP FOR AN ELECTRIC SCOOTER AND CORRESPONDING SCOOTER

(71) Applicant: ASKOLL EVA S.R.L., Povolaro di Dueville, Vicenza (IT)

(72) Inventor: Elio Marioni, Vicenza (IT)

(73) Assignee: Askoll Eva S.r.l. (IT)

( * ) Notice: Subject to any disclaimer, the term of this patent is extended or adjusted under 35 U.S.C. 154(b) by 0 days.

(21) Appl. No.: 14/632,621

(22) Filed: Feb. 26, 2015

(65) Prior Publication Data
US 2015/0266535 A1 Sep. 24, 2015

(30) Foreign Application Priority Data
Mar. 20, 2014 (EP) .................................... 14425036

(51) Int. Cl.
*B62M 7/00* (2010.01)
*B62K 11/10* (2006.01)
*B62M 7/02* (2006.01)
(Continued)

(52) U.S. Cl.
CPC . *B62K 11/10* (2013.01); *B60K 1/00* (2013.01); *B60K 1/04* (2013.01); *B60L 11/1803* (2013.01); *B60L 11/1816* (2013.01); *B60L 11/1822* (2013.01); *B60L 11/1877* (2013.01); *B60L 11/1879* (2013.01); *B60L 15/2054* (2013.01); *B62M 7/00* (2013.01); *B62M 7/02* (2013.01); *B62M 7/12* (2013.01); *B62M 9/02* (2013.01); *B62M 9/16* (2013.01); *B60K 2001/006* (2013.01); *B60L 2200/12* (2013.01); *B60L 2220/12* (2013.01); *B60L 2220/14* (2013.01);
(Continued)

(58) Field of Classification Search
CPC .................................. B62M 7/00; B62M 7/06
USPC ......................................................... 180/220
See application file for complete search history.

(56) References Cited

U.S. PATENT DOCUMENTS 4,632,070 A * 12/1986 Onda ........................ B62M 7/06
123/41.58
5,101,924 A * 4/1992 Yamagiwa ................ B62M 7/12
180/220
(Continued)

FOREIGN PATENT DOCUMENTS

| EP | 1 691 470 A1 | 8/2006 |
| EP | 1 702 781 A2 | 9/2006 |
| EP | 2 527 236 A1 | 11/2012 |

OTHER PUBLICATIONS

European Search Report issued in connection with EP 14 42 5036.

*Primary Examiner* — Anne Marie Boehler
*Assistant Examiner* — Michael Stabley
(74) *Attorney, Agent, or Firm* — Akerman LLP

(57) ABSTRACT

The invention relates to an electric propulsion unit (10) and torque transmission group (11) for operating the rear wheel (13) of an electric scooter (1) with body (2) of the step-through type and with upright sitting portion (6). The electric propulsion unit (10) comprises at least one synchronous electric motor (30) of the type comprising internal stator (32) and external rotor (29) with a cup-shaped form rotating on a fixed shaft (33) rigid with the stator (32); the motor is installed in a barycentric position substantially at the base of the upright sitting portion (6) with the fixed shaft (33) transverse to the longitudinal axis (X-X) of the scooter (2), and the transmission group (11) comprises at least one first and one second reduction stage (24, 26).

10 Claims, 12 Drawing Sheets

(51) Int. Cl.
 B62M 7/12 (2006.01)
 B60K 1/00 (2006.01)
 B60K 1/04 (2006.01)
 B62M 9/02 (2006.01)
 B62M 9/16 (2006.01)
 B60L 11/18 (2006.01)
 B60L 15/20 (2006.01)
(52) U.S. Cl.
 CPC ....... *B60L 2240/423* (2013.01); *B62K 2202/00* (2013.01)

(56) References Cited

U.S. PATENT DOCUMENTS

| | | | | |
|---|---|---|---|---|
| 5,222,572 | A * | 6/1993 | Yamagiwa | B62M 9/08 180/220 |
| 5,406,154 | A * | 4/1995 | Kawaguchi | B60L 7/10 180/220 |
| 5,421,427 | A * | 6/1995 | Ogawa | B60L 11/1805 180/220 |
| 5,853,058 | A | 12/1998 | Endo et al. | |
| 5,900,686 | A * | 5/1999 | Tabata | B60K 7/0007 310/68 B |
| 6,037,726 | A | 3/2000 | Tabata et al. | |
| 6,095,891 | A * | 8/2000 | Hoeting | A63H 17/22 446/431 |
| 6,547,024 | B2 * | 4/2003 | Ohyama | B62K 25/283 180/219 |
| 7,140,458 | B2 * | 11/2006 | Nakagawa | B60K 1/04 180/219 |
| 7,255,188 | B2 * | 8/2007 | Tsukada | B60K 6/383 180/220 |
| 7,392,870 | B2 * | 7/2008 | Kojima | B60K 6/44 180/220 |
| 7,497,288 | B2 * | 3/2009 | Tsukada | B60K 1/00 180/68.1 |
| 7,610,987 | B2 * | 11/2009 | Aoyama | F02B 61/02 180/220 |
| 7,819,211 | B2 * | 10/2010 | Fukami | B60K 6/40 180/220 |
| 2004/0238242 | A1 | 12/2004 | Honda et al. | |
| 2010/0236856 | A1 * | 9/2010 | Nomura | B60K 6/40 180/292 |
| 2011/0024217 | A1 * | 2/2011 | Sluijter | B62K 11/10 180/208 |
| 2012/0000720 | A1 * | 1/2012 | Honda | B62K 11/10 180/65.1 |
| 2012/0081220 | A1 * | 4/2012 | Tamaki | B60Q 5/008 340/435 |
| 2012/0103706 | A1 | 5/2012 | Kondo et al. | |
| 2012/0193155 | A1 * | 8/2012 | Hasegawa | B62K 11/04 180/65.1 |

* cited by examiner

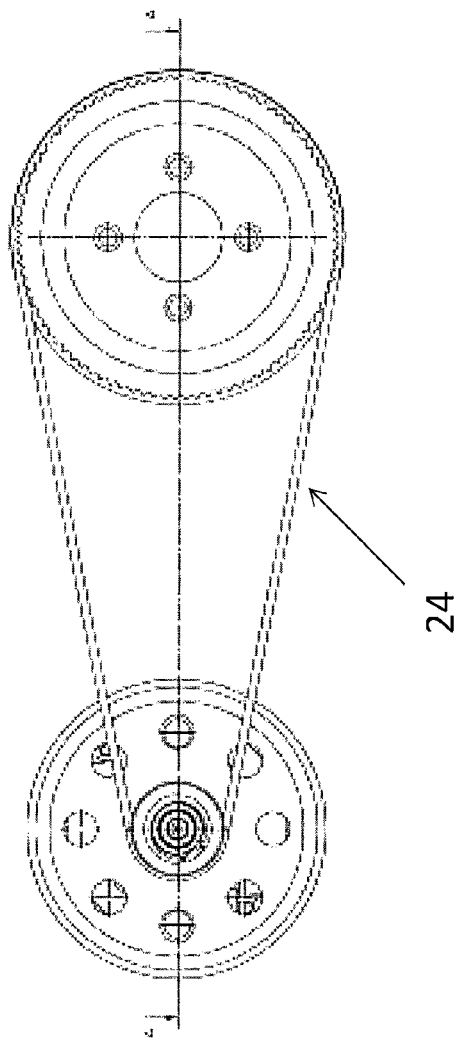
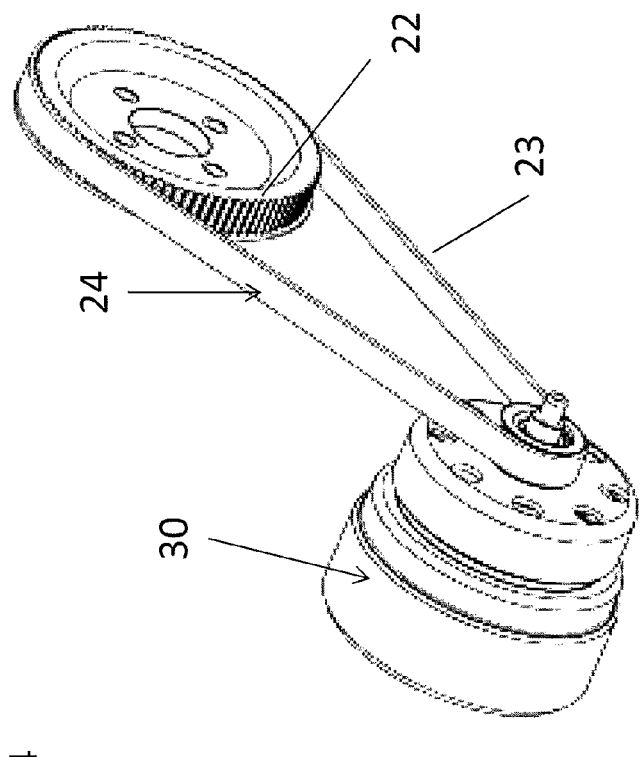
FIG. 8
FIG. 9

ELECTRIC PROPULSION UNIT AND TORQUE TRANSMISSION GROUP FOR AN ELECTRIC SCOOTER AND CORRESPONDING SCOOTER

CROSS-REFERENCE TO RELATED APPLICATIONS

The present application claims priority to European Patent Application No. 14425036.2, filed Mar. 20, 2014, the entirety of which is incorporated herein by reference.

FIELD OF APPLICATION

The present invention relates to an electric propulsion unit and torque transmission group for an electric scooter and to a corresponding scooter on which said propulsion unit is installed.

More particularly, the invention relates to an electric propulsion unit and torque transmission group for operating the rear wheel of an electric scooter with a body of the step-through type and with an upright sitting portion, said electric propulsion unit comprising at least one synchronous electric motor.

PRIOR ART

For some years now, following a growing awareness with regard to environmental issues, so-called "zero emission vehicles" (ZEV) have been developed and become more widespread. These vehicles in fact are characterized by the fact that they release practically zero polluting emissions into the atmosphere.

In particular the most common zero emission vehicles are electrically propelled transportation means or electric vehicles.

The characteristic feature of these electric vehicles is that they have an electric motor which uses as energy source the energy stored in one or more rechargeable batteries. It is widely known that one of the main problems preventing the widespread use of electrically propelled vehicles is the poor efficiency of energy storage and the electric-battery recharging cycles.

Among all electric vehicles, those which are less affected by the drawbacks associated with use of the batteries and therefore autonomy, are scooters since they are used for relatively short distances, often only in an urban environment, they have a balanced weight/power ratio and are able to transport a battery set or pack suitable for the use and autonomy which the scooter must have.

Electric scooters are very silent, do not produce any polluting emissions and ensure several tens of kilometers of autonomy, even up to 60-80 km in the case of the most advanced models, in particular those equipped with lithium batteries.

These electric scooters are currently designed for specific market sectors. For example, a vast range of three-wheel or four-wheel electric scooters, operating at low or very low speeds and designed mainly to meet the mobility needs of old and disabled people, is currently available on the market.

Another different type of scooter consists instead of scooters, similar to a motorcycle, which are capable of reaching high speeds, but are extremely costly and sophisticated and intended exclusively for an elite of users who are particularly sensitive to ecological issues, but are not worried by the high purchase and maintenance costs.

An intermediate range of two-wheel scooters which are lighter and more manageable has instead been developed and has become quite popular for performing routine daily duties in the public sector, such as mail distribution.

While meeting the various different requirements of users as briefly described above, these electric scooters have not yet become widespread mainly because their production is still hindered by technical problems which have not yet been solved. In addition to the aforementioned problems associated with the battery pack, there is also the problem of the electric motor which drives the scooter and the difficulties of producing at a competitive cost motors and transmissions for scooters which are able to ensure a good response to operating commands in all riding conditions along winding or undulating roads.

Nowadays, for the private consumer increasingly sensitive to ecological issues, the greatest obstacle to acquiring an electric scooter is the purchase cost in relation to the performance features and autonomy which can be achieved.

Therefore the main factor preventing the large-scale distribution of electric scooters is the substantial limitation of the potential target users.

Another factor hindering the spread of electric scooters is their typical poor handling, the poor initial acceleration on hills and the need for frequent recharging of the batteries.

In the light of these problems an essential need is to develop the motor and transmission group in an attempt to render it more efficient, achieve a lower energy consumption during initial acceleration and overall obtain a greater autonomy of use, all of which at a low cost.

Hitherto, the known art has attempted to provide a solution to these problems by attempting for example to optimize each of the component parts of the electric scooter, namely by using the best electric motor possible, the best transmission and the best batteries. The result has been precisely that of providing scooters which are extremely costly and substantially without a market.

Moreover, more recently it has been noted that the technology would appear to be oriented towards the use of permanent-magnet synchronous motors as propulsion units for this type of scooter, but paradoxically the use of such motors has diminished owing to the dramatic increase in the cost of rare earths which are conventionally used for the production of these motors.

In order to maintain competitive prices, manufacturers have thus been obliged to resort to alternative heavier and larger-volume solutions, such as asynchronous motors or excited-rotor synchronous motors, to the detriment of the compactness and the electric power consumption of the motor unit.

The technical problem underlying the present invention is that of devising a motor unit and transmission group for electric scooters having structural and functional characteristics such as to be able to overcome the limitations and drawbacks of the solutions proposed by the prior art and ensure a particularly compact configuration, a satisfactory transmission ratio and a lower electric power consumption, while reducing at the same time the production costs for the manufacture of said group.

SUMMARY OF THE INVENTION

The proposed solution forming the basis of the present invention has been that of developing in synergism the electric motor unit and torque transmission group so as to provide an innovative solution designed expressly for the traction of the electric scooter, i.e. avoiding using already proven solutions, but focusing on the need for mobility, autonomy and reliability which this type of electric vehicle must have.

The technical problem has been solved by an electric propulsion unit and torque transmission group for operating the rear wheel of an electric scooter with a body of the step-through type and with upright sitting portion, said electric propulsion unit comprising at least one synchronous electric motor, characterized in that said synchronous electric motor is of the type comprising internal stator and external rotor with a cup-shaped form rotating on a fixed shaft rigidly connected to the stator, the motor being installed in a barycentric position substantially at the base of the upright sitting portion with the fixed shaft transverse to the longitudinal axis of the scooter, and in that said transmission group comprises at least one first and one second reduction stage.

Advantageously, said at least one first and second reduction stages are formed with a belt-and-pulley transmission. Moreover, the transmission is formed with toothed pulleys and belts.

It is envisaged providing a housing containing said transmission group and also a support sliding inside said housing for an intermediate shaft inserted between said first and second reduction stages, so as to allow relative tensioning of the transmission belts.

A heat dissipator forming an axial extension of the fixed drive shaft is associated with the stator of the electric motor.

The synchronous motor is of the brushless type driven by means of an inverter.

A compartment for housing batteries is also provided in the upright sitting portion. At least two structurally independent battery packs consisting of rechargeable batteries are housed inside said compartment.

The batteries are removable and provided with a battery charger and power plug connector for rapid connection to an electric power supply network.

Moreover, each battery pack is individually removable so as to allow independent external recharging.

In a variation of embodiment the propulsion unit comprises a second synchronous electric motor which can be selectively coupled to the transmission group by means of free wheel mechanism.

The features and advantages of the electric propulsion unit and torque transmission group according to the present invention will become clear from the description, provided hereinbelow, of a preferred example of embodiment provided by way of a non-limiting example with reference to the accompanying drawings.

BRIEF DESCRIPTION OF THE DRAWINGS

FIG. 8 shows a front view of the portion of the transmission group according to FIG. 7 connected to the electric propulsion group;

FIG. 9 shows a perspective view of the portion according to FIG. 7 of the torque transmission group of the scooter according to the invention in the assembled configuration;

DETAILED DESCRIPTION

Figure 1:
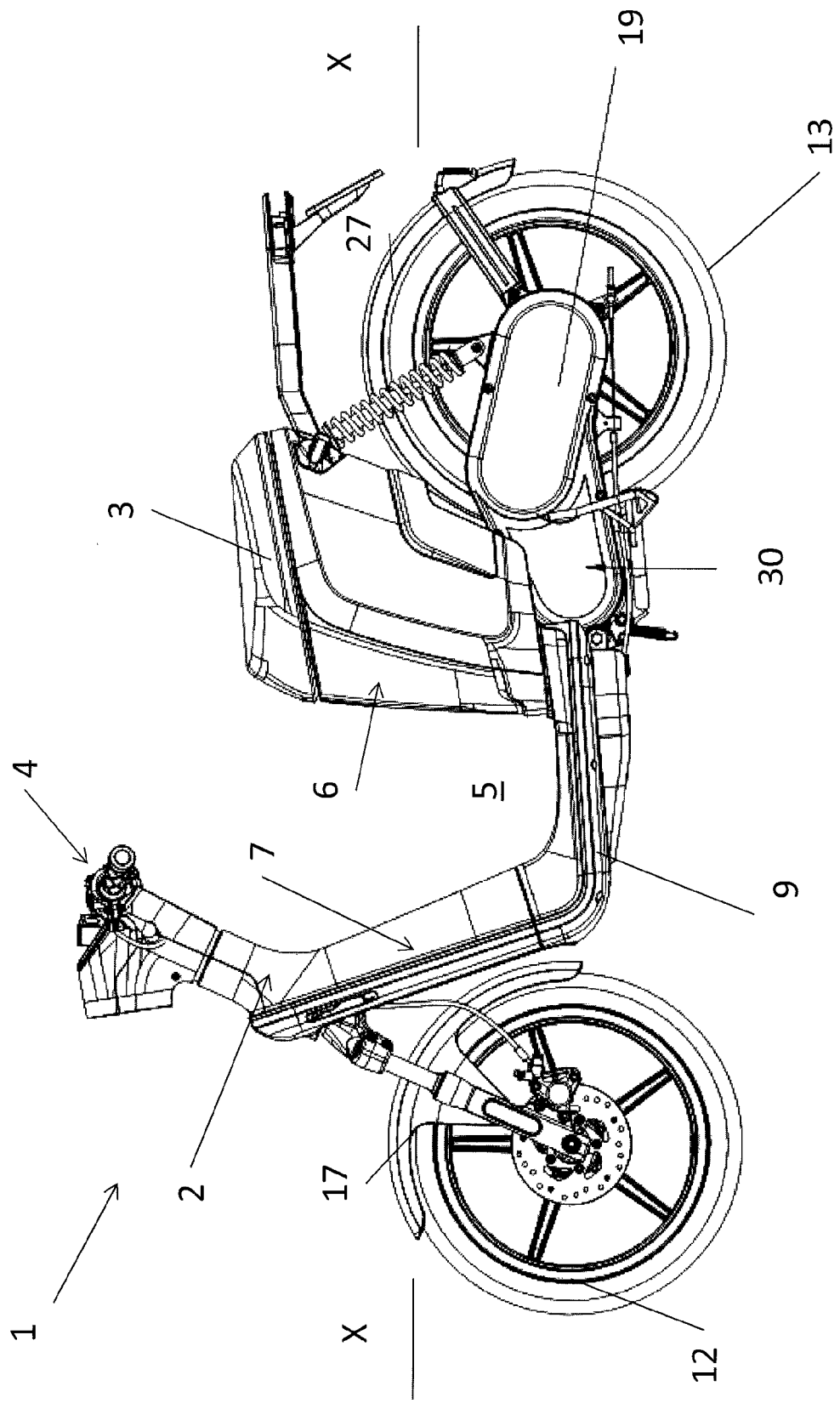
FIG. 1 shows a vertical and side elevation view of an electric scooter provided in accordance with the present invention.
Figure 2:
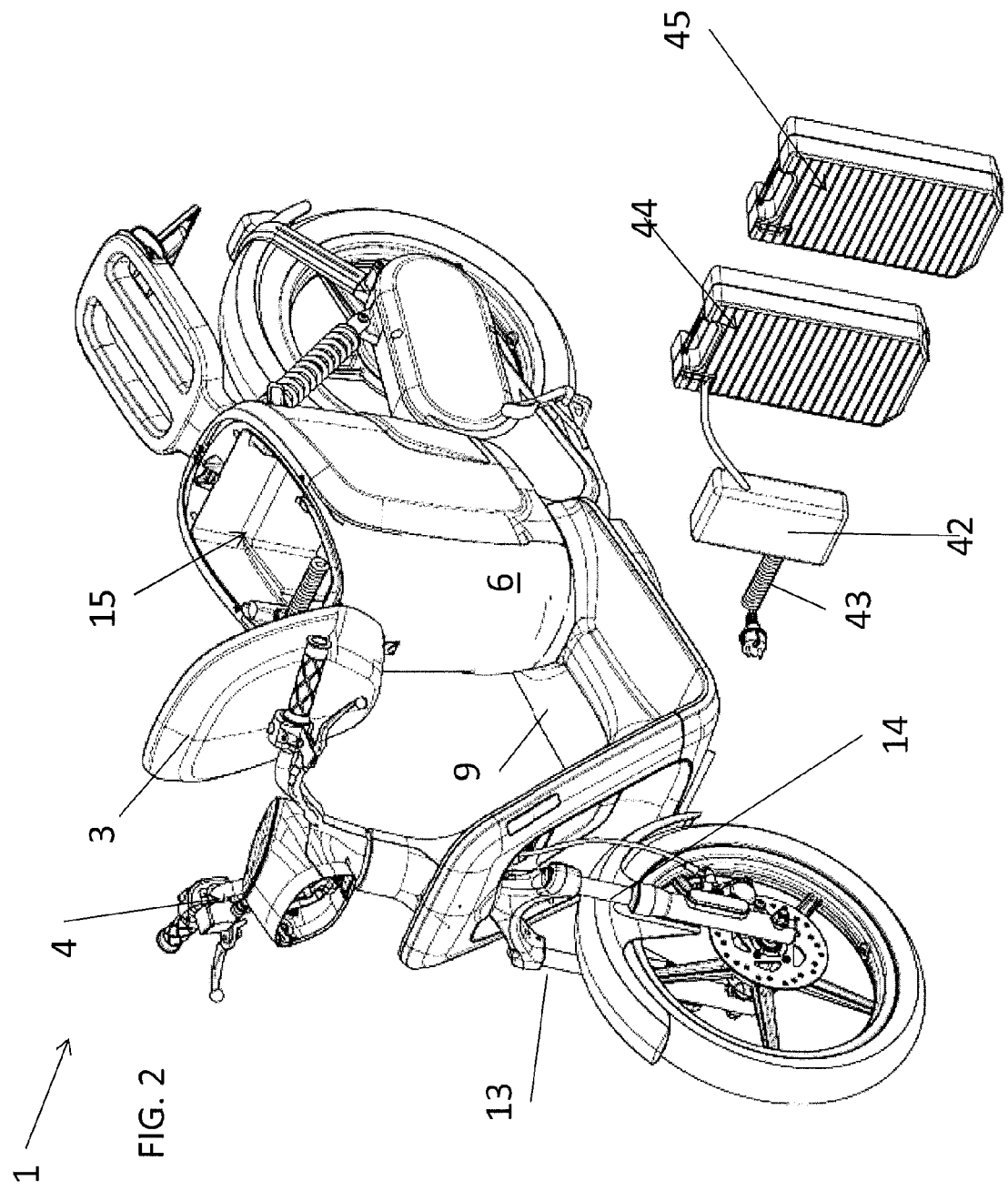
FIG. 2 shows a perspective view of the electric scooter according to FIG. 1 in which a compartment for housing the electric batteries underneath the seat is indicated.

With reference to these drawings, and in particular the example of FIG. 1, the reference number 1 denotes overall and in schematic form an electrically propelled vehicle which is designed in accordance with the present invention and which will be referred to below as a motor scooter or electric scooter.

In the preferred embodiment described here by way of a non-limiting example the electrically propelled vehicle is a two-wheel scooter with a weight, power and maximum speed which is in line with that of conventional motor scooters. By way of a guide, the electric scooter according to the present invention may have a weight of less then 60 kg, a power of up to 2 kW and a maximum speed of less than 45 km/h, such as to be comparable under Italian law to a motor scooter or a lightweight motorcycle.

The vehicle disclosed herewith comprises a frame or body 2 of the step-through type, namely the rider gets onto or mounts the scooter by passing through a lowered central part 5 of the body 2 and sits on an upright sitting portion 6 which comprises a seat 3 and grips the front maneuvering handlebars 4.

The scooter 1 has a support frame 20 on which the body 2 with the central step-through portion 5 is mounted.

A front shield 7 which protects the rider's legs is provided between the handlebars 4 and the central lowered portion 5 of the body 2. A foot-rest portion 9 which continuously connects the shield 7 to the upright portion 6 of the seat 3 is also provided.

The upright portion 6 is provided with a fairing and conceals an ample compartment 15 underneath the seat for housing electric batteries, which will be described in detail below with reference to FIGS. 2 to 6.

The electric scooter 1 comprises two wheels 12, 13 in line along a longitudinal axis X-X of the vehicle.

The front wheel 12 is conventionally mounted idle on a front fork 14, 16, while the rear wheel 13 is a driving wheel. The wheels at the top are protected by respective mudguards 17 and 27.

The scooter is operated by an electric propulsion unit 10 with an associated torque transmission group 11 designed for connection to the rear wheel 13.

Advantageously, the electric propulsion unit 10 comprises at least one brushless synchronous electric motor 30 of the type with an internal stator 32 and an external rotor 29. The motor 30 is driven by an inverter which is associated with an electronic board 28 for regulating and controlling operation of the motor.

As mentioned, this electric motor 30 is of the so-called internal stator and external stator type, namely one where the rotor 29 is mounted on the outside of the respective stator 32 on a basket-shaped support housing. The structure of the motor 30 is described for example in European patent No. EP 1,691,470 in the name of the same Applicant.

For completeness of the description it is pointed out that the stator 32 of the motor 30 has a substantially cylindrical configuration and comprises a plurality of pole shoes which are known per se, for example formed by means of a plurality of laminations which are arranged in a pack on top of and in contact with each other and mounted fixed on a central axis.

The internal stator 32 has a plurality of poles defined by packs of radial laminations around which the electric windings are wound. Sintered end elements made of SMC (soft magnetic composites) which form the pole shoes are positioned at the outer end of each of the lamination packs.

The external rotor 29 comprises a main cup-shaped body; the internal surface of the edge of the external rotor 29, facing the air gap or the synthesis material of the stator, supports a magnetic ring which is made of plastoferrite injected using thermoplastic moulding (injection-moulding) techniques.

The internal stator 32 is keyed onto the respective fixed shaft 33.

The main cup-shaped body of the external rotor 29, which surrounds the internal stator 32, has a bottom surface which is connected to a tubular portion 25 which extends away from the internal stator 32 and is rotatably supported on the fixed shaft 33 by means of bearings.

A radial-expansion centrifugal clutch 38 may be provided rigidly connected to the external rotor 29 on the side where the tubular portion 25 is situated.

The presence of the clutch 38 is optional and it is quite possible to connect directly the tubular portion of the rotor 29 to a first driving pulley 21 forming part of the transmission group 11 which will be described below.

The synchronous electric motor 30 also comprises the electronic control board 28 which is electrically connected to the motor and a heat dissipator 34 associated with the electronic management and control board 28. The board 28 also contains resident software which controls operation of the electric motor and the torque requirements of the scooter, as will become clear from the description below. A detailed explanation of operation of the driver electronics is however not included in the present description.

Figure 4:
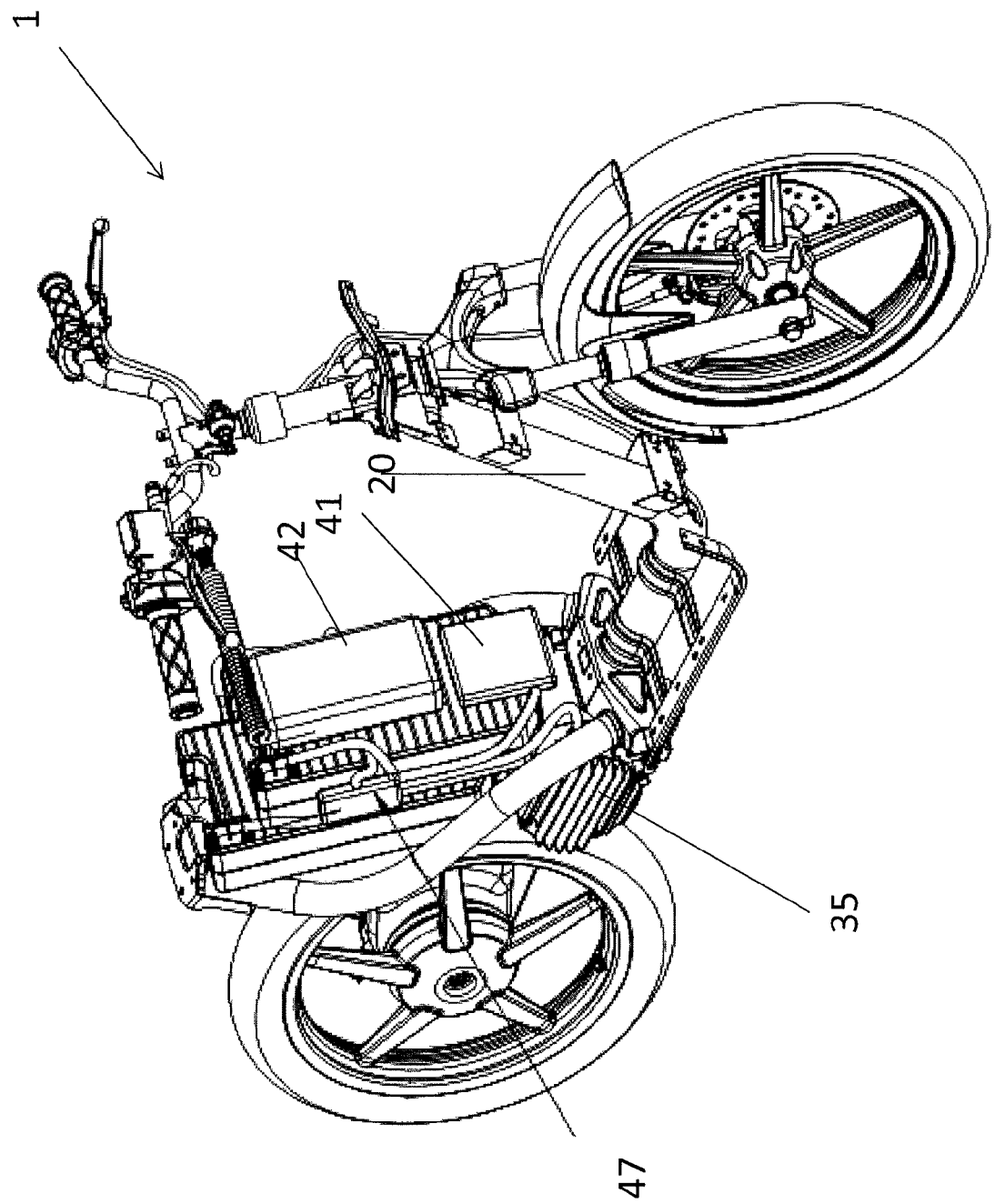
FIG. 4 shows a further perspective view of the scooter according to FIG. 3 viewed from another viewing side.
Figure 5:
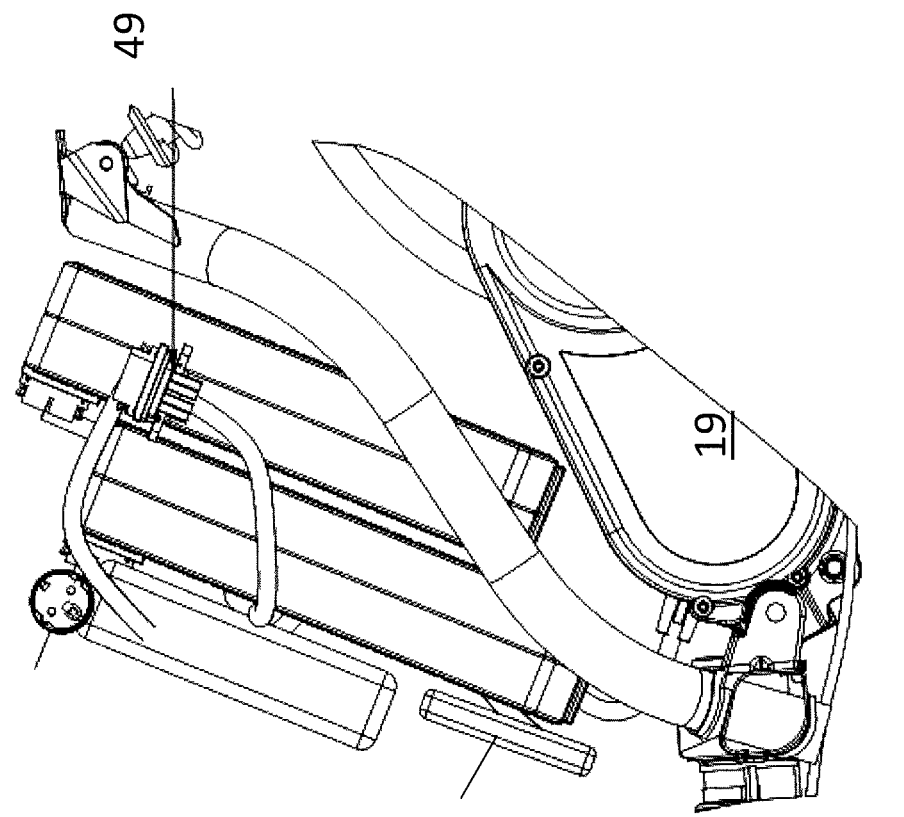
FIGS. 5 and 6 are respective and opposite side views of a detail of the central portion without fairing of the scooter according to the invention.

The electronic board 28 is known per se, as is also the heat dissipator element 34 which has a lamination-like form with a broad heat-exchange surface area, visible in FIGS. 4 and 5. According to the present invention, the heat dissipator element 20 is mounted on the stator 5 along an axial extension thereof in a predetermined relationship spaced from it so as to allow the arrangement of the electronic board in between.

Figure 11:
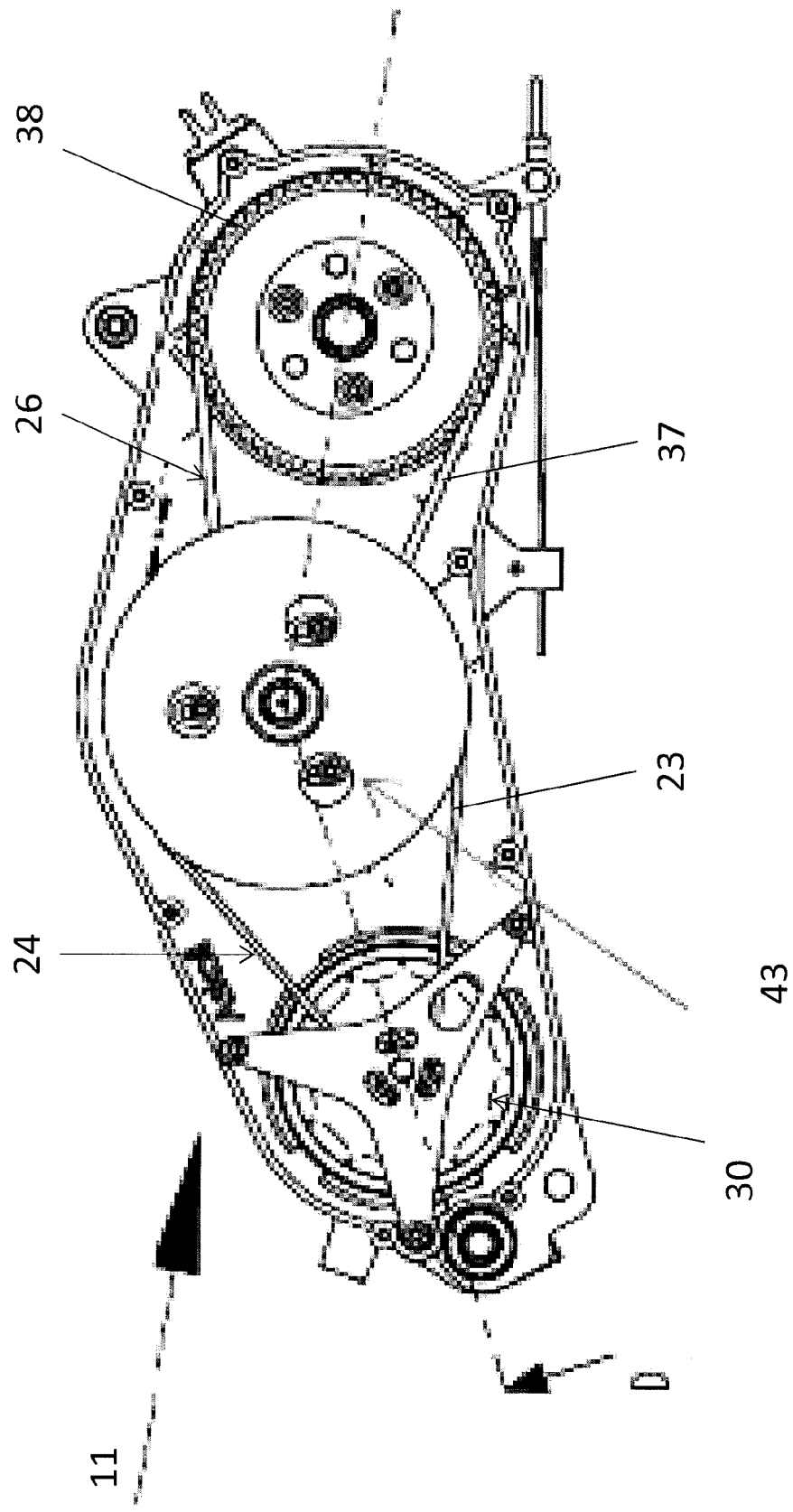
FIG. 11 shows a front view of the torque transmission group as a whole.
Figure 12:
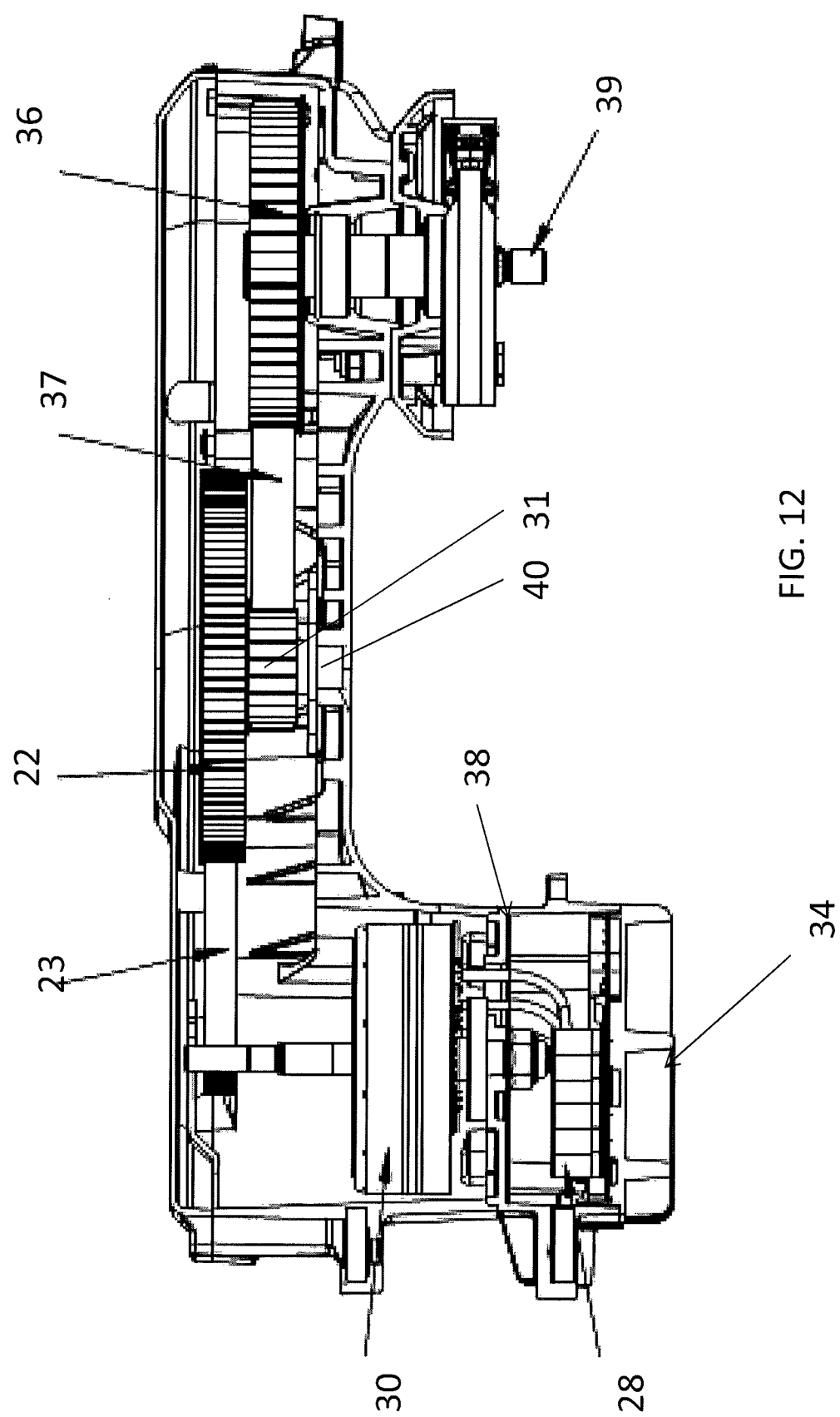
FIG. 12 shows a top plan view of the electric propulsion unit and torque transmission group for the scooter according to the present invention.

Moreover, the electronic control board 28, associated with the inverter, is supported by the heat dissipator element 34, on one side of the latter, as shown in FIG. 11, in order to obtain an electrical connection with a small amount of wiring.

The assembly consisting of motor 30 and dissipator 34 is housed inside an aluminium compartment with a finned cover 35 so as to favour dissipation of the heat.

Advantageously, according to the invention, the synchronous motor 30 is installed in a barycentric position substantially at the base of the upright sitting portion 6 with the shaft 33 of the motor 30 transverse to the longitudinal axis X-X of the scooter 2.

This arrangement provides the entire structure of the scooter with particular stability and ensures balancing of the weight of the vehicle with a better overall distribution of the weights.

Moreover, in order to increase the power output performance, the motor has been designed with suitable dimensions, optimizing the dimensional ratio between rotor and stator poles. The motor has been designed so as to be modular, i.e. its performance characteristics are associated with its axial length, while its radial dimensions remain unchanged, allowing efficient and low-cost management of the mould used to manufacture the magnet using anisotropic ferrite which is oriented by a magnetic field during the injection-moulding process, this magnetic field being generated by a magnetic circuit which is formed in the mould.

The electric propulsion unit 10 and the corresponding transmission group 11 are enclosed externally by the casing 19 or housing. The front and rear ends of the casing 19 have points for fastening to the frame 20 of the scooter 1.

The structure of this mechanism will now examined in greater detail.

The torque transmission group 11 which allows the motor 30 to be kinematically connected to the rear wheel 13 comprises two transmission stages 24, 26 with toothed belts and pulleys.

The casing 19 has a form which extends in a substantially longitudinal direction, inclined with respect to the centre, corresponding to the angled arrangement of the first and second transmission stages 24, 26.

Essentially, the stages 24 and 26 constitute two kinematically connected reduction stages where a first reduction stage 24 comprises transmission members which transmit the movement from the rotor 29 to an intermediate shaft and a second reduction stage 26 comprising further transmission members for transmitting the movement from the intermediate shaft to a shaft for driving the rear wheel.

The first stage 24 comprises a belt 23 extending between a first driving pulley 21 rigidly connected to the rotor 29 of the synchronous motor 30 and a first transmission pulley 22 mounted rotatable on an intermediate shaft provided inside a casing or housing 19 containing the transmission group 11.

A second stage 26 comprises a belt 37 extending between a second driving pulley 31 coaxial with the transmission pulley 22 and a second traction pulley 36 rigidly connected to a traction shaft onto which a hub 39 of the rear wheel 13 is keyed.

The first driving pulley 21 and the second traction pulley 36 have a fixed interaxial distance and the adjustment of the relative tension of the belts 23 and 37 is performed by means of a particular supporting arrangement of the coaxial transmission pulley 22 and driving pulley 31.

More particularly, the coaxial and central pulleys are supported on a same intermediate shaft which is in turn slidably mounted on a slide 40 having a predetermined freedom of movement through an eyelet-shaped slot in the casing 19 containing the transmission group 11.

Figure 13:
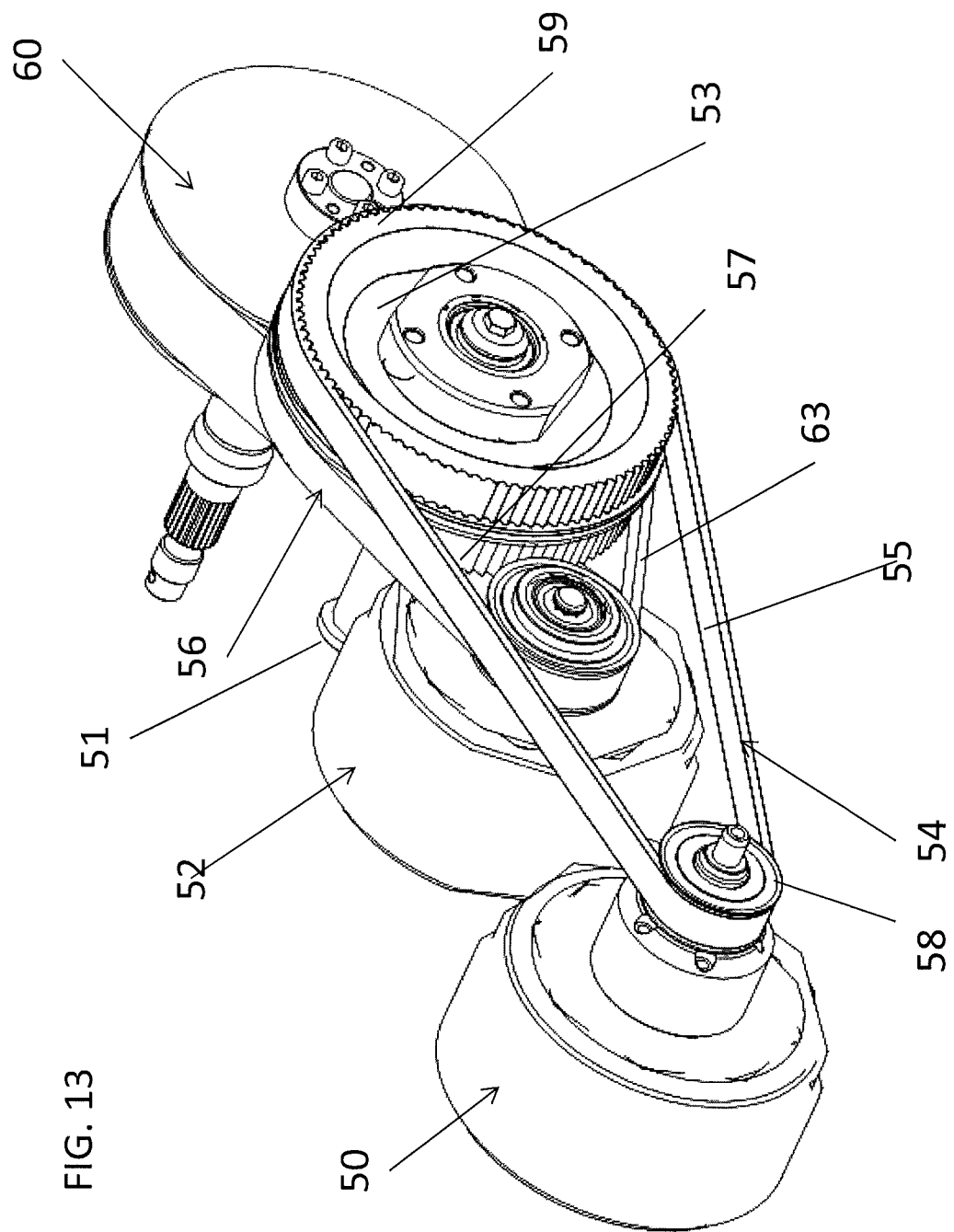
FIG. 13 shows a perspective view of a variation of embodiment of the electric propulsion unit and torque transmission group according to the invention.
Figure 14:
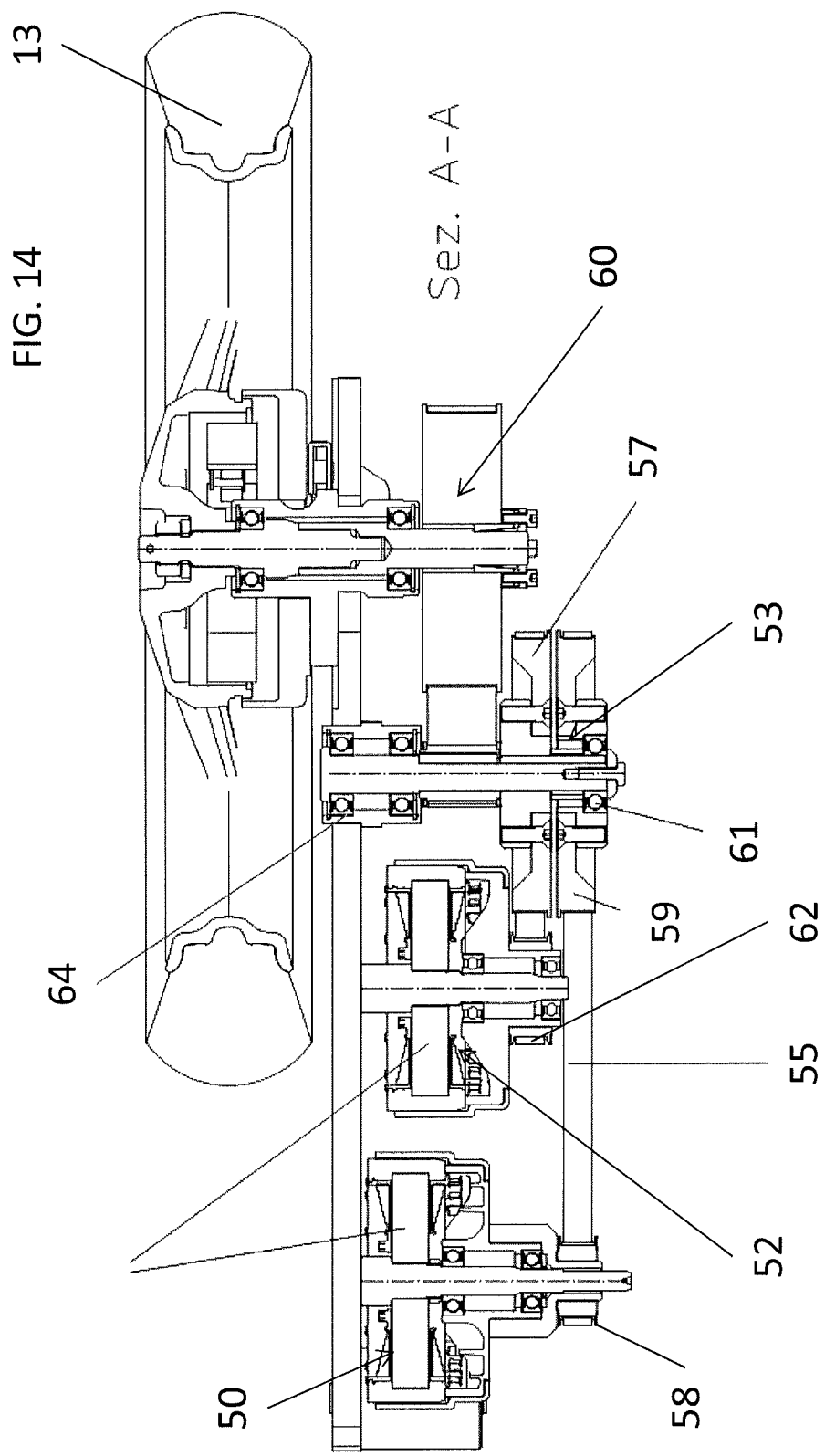
FIG. 14 shows a cross-sectional view of the variation of embodiment according to FIG. 13.

In a variation of embodiment, which is still based on the principles of the present invention, the electric propulsion unit 10 and the torque transmission group 11 are modified so as to increase the power output of the scooter. An example of this variation of embodiment is shown in FIGS. 13 and 14.

In this variation of embodiment it is envisaged using two permanent-magnet synchronous electric motors 50 and 52.

The internal structure of the motors 50 and 52 corresponds to that already described above with reference to the synchronous motor 30.

The variant with two motors has a free wheel 53 with a two-stage belt transmission. This allows the use of either one of the two motors, which are again driven by an inverter.

Advantageously, depending on the power required, for example when starting or on an uphill slope, it is possible to operate both the motors 50, 52, while in normal conditions of use, such as on flat ground at a constant speed, it is possible to operate only one motor, saving energy.

More particularly, in a similar manner to the first example of embodiment, the transmission group 11 of this alternative embodiment comprises a first belt-and-pulley reduction stage 54 in which a first driving pulley 58, which is rigidly connected to the rotor of the first motor 50, is kinematically connected to a pulley 59 mounted on the free wheel 53, via a toothed belt 55. The free wheel 53 is supported on a spindle 51 by means of bearings 61.

This first reduction stage 54 has a corresponding second belt-and-pulley reduction stage 56 in which a second driving pulley 62, rigidly connected to the rotor of the second motor 52, is kinematically connected to a second driven pulley 57 via a toothed belt 63. Only the second motor 52 is always connected, while the first motor 50 intervenes depending on the torque demand requirements.

The free wheel 53 and the driven pulley 57 are coaxial with each other and supported on an intermediate spindle 51 which is advantageously mounted rotatably on the casing 19 containing the transmission group via bearings 64.

When the scooter is travelling in a straight line and a smaller driving torque and power are required, the motor 50 is switched off by the electronic control system and the free wheel 53 disengages it from the shaft 51; only the motor 52 which is still engaged is able to supply torque and power sufficient for maintaining the speed set by the user. In more severe conditions, for example when travelling uphill, the motor 50 is switched on automatically when a speed synchronised with the motor 52 is reached, and at the same time the free wheel which rigidly connects it to the shaft 51 is locked. The two motors 50, 52 are therefore connected together and able to meet the surplus torque and power requirement.

An end stage with a mechanism 60 connects a pulley rigid with the rotatable spindle 51 to the transmission hub of the rear wheel 13.

The description of the present invention is now completed by the details relating to the battery system which constitutes the electric power source of the scooter 1.

The scooter 1 is designed to house inside the compartment 15 underneath the seat at least two extractable battery packs 44, 45; each pack 44, 45 has inside it a battery management system (BMS) for managing the battery charge, which is incorporated in an electronic control unit 41 for supervising and controlling operation of the scooter 1.

Figure 3:
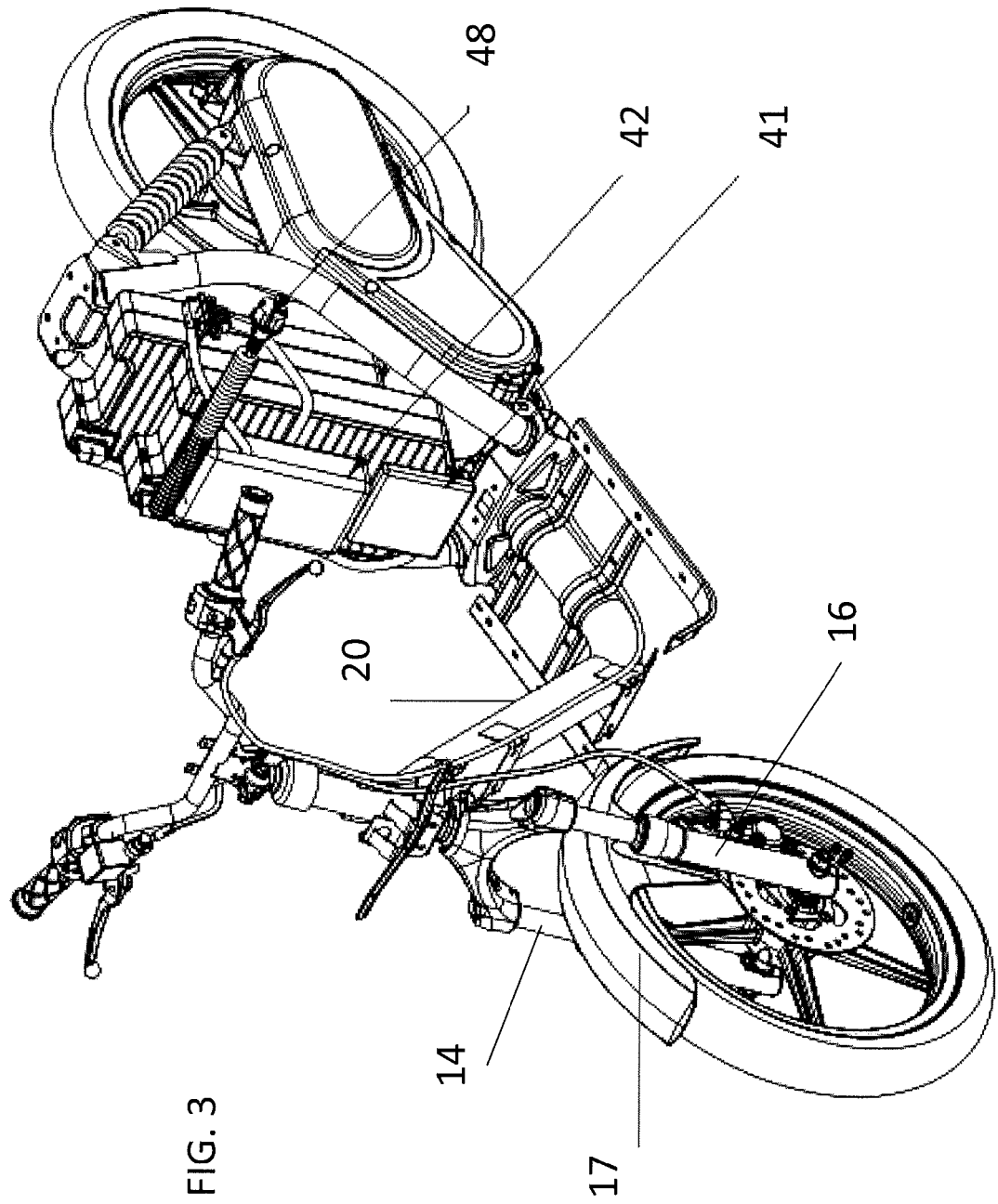
FIG. 3 shows a perspective view of the scooter according to FIG. 1, without bodywork so that the inside of the compartment shown in FIG. 2 may be seen.

In FIGS. 3 and 4 it is possible to see clearly the removable battery packs 44, 45, the control unit 41 and an externally accessible connector 48 which protrudes from the outer surface of the fairing of the upright sitting portion 6 and allows a quick-fit connection to the electric power supply network for recharging the batteries kept on the scooter.

Figure 6:
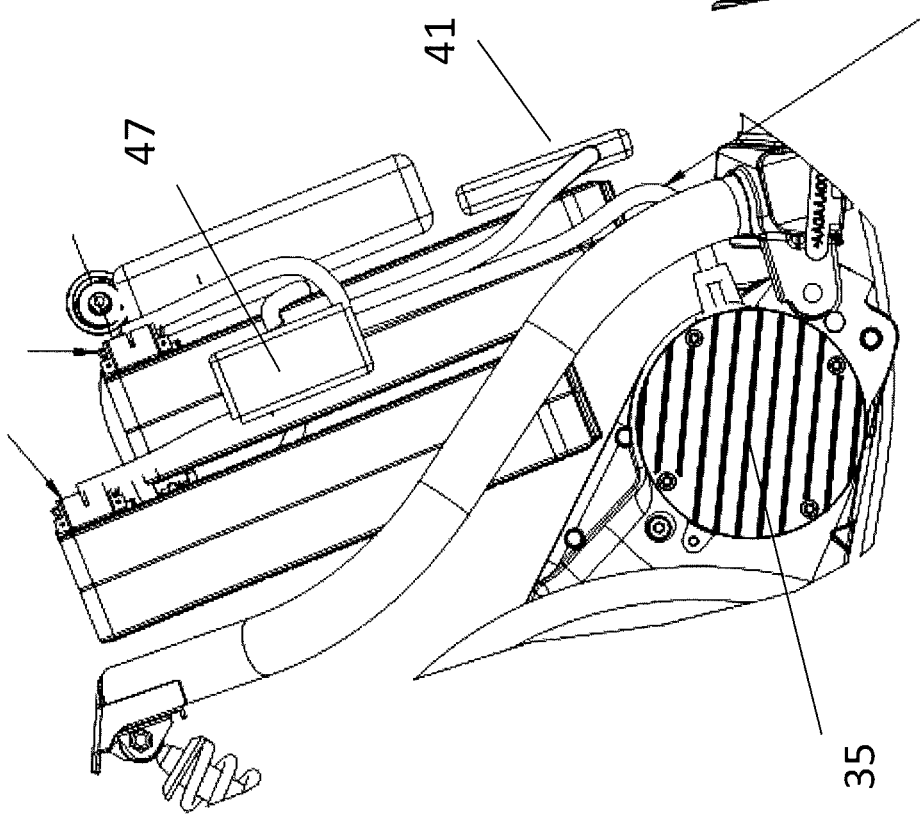
Figure 7:
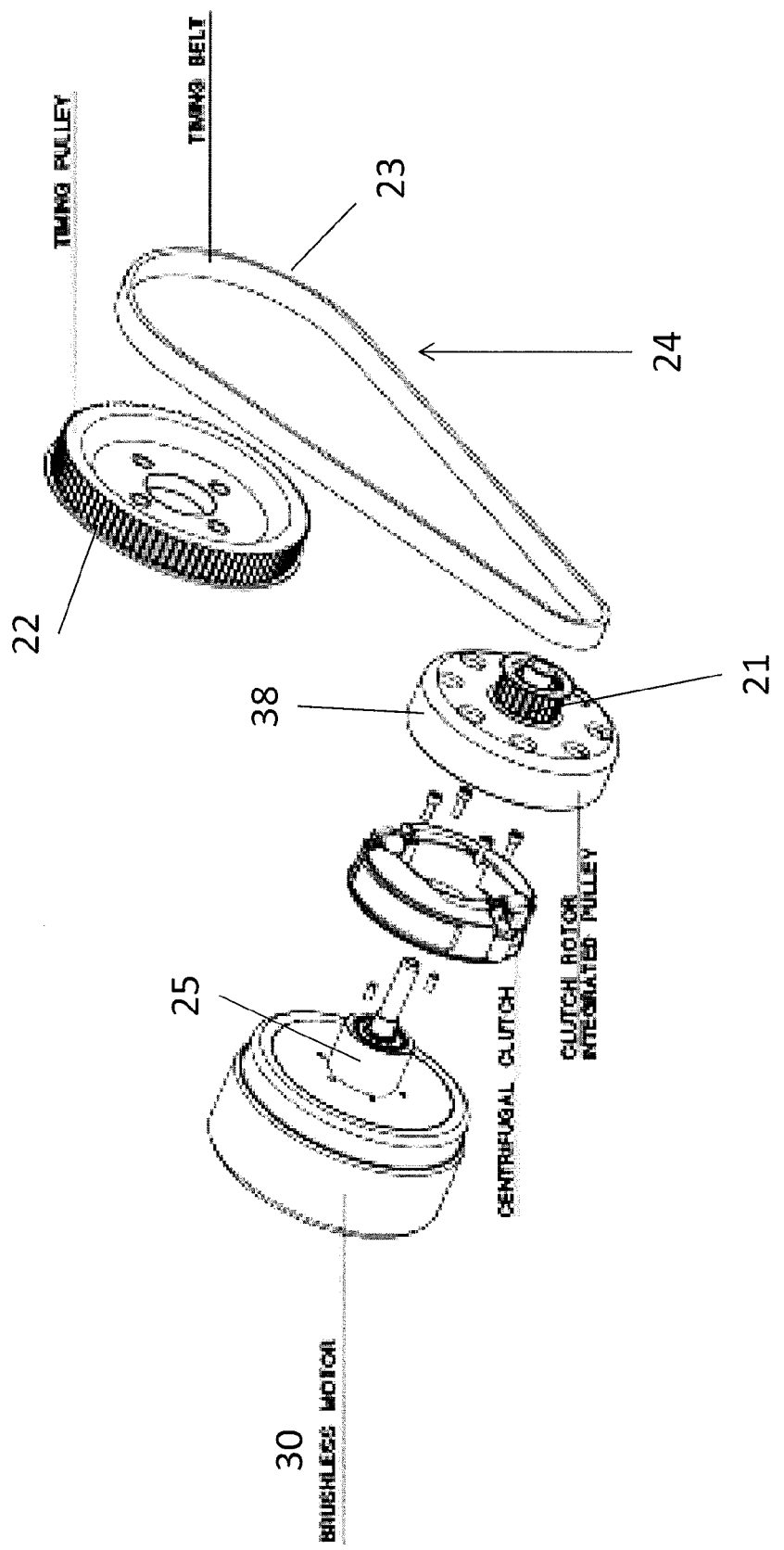
FIG. 7 shows an exploded perspective view of a portion of the torque transmission group of the scooter according to the invention.
Figure 10:
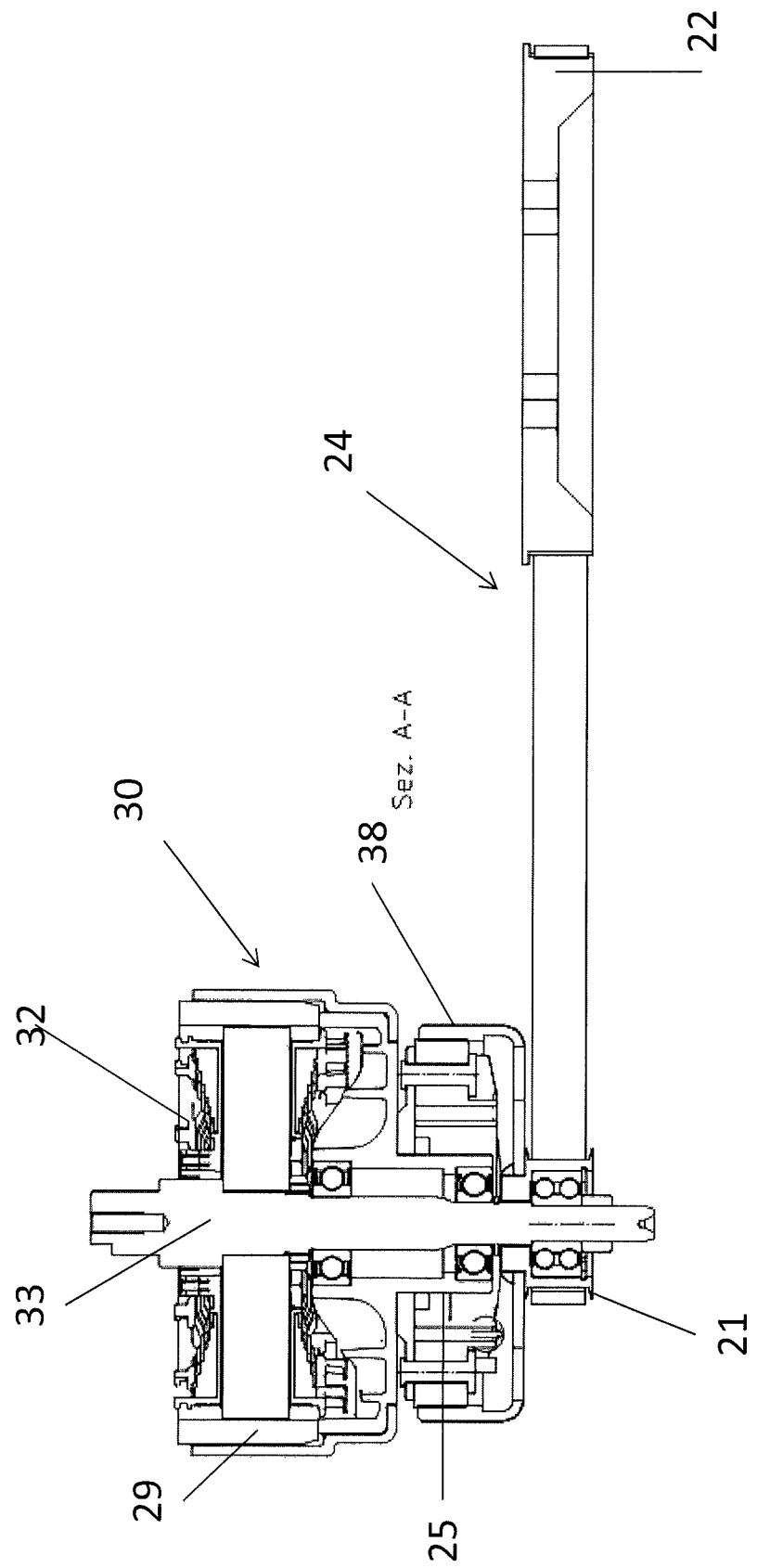
FIG. 10 shows a horizontally sectioned view along the line A-A of FIG. 8.

An interconnecting element 49, which can be seen in FIG. 6 and allows the entire battery assembly to be removed from the compartment 15, is arranged on the electrical connection line between the external connector 48 and the battery packs.

The two battery packs 44, 45 are, however, structurally independent of each other and also independently removable by means of a connector 47 which is clearly visible in FIG. 5 and allows them to be rapidly connected or disconnected to/from each other.

Moreover, the specially designed compartment 15 in the scooter houses a battery charger 42 with associated cable 43 and mains plug for connection to a conventional mains socket, the entire removable assembly being connected to the aforementioned control unit 41 by means of quick-fit connectors.

The battery charger 42 is obviously provided with a current transformer.

This system allows charging and checking of the state of the batteries, while leaving the packs 44, 45 interconnected in the scooter; alternatively, however, it is possible to extract manually the battery packs 44, 45 and connect directly the battery charger 42 also to only one of the battery packs, thus allowing the components to be more easily moved to a location where there is a mains socket which cannot be easily or conveniently reached by the scooter itself.

From the above description it is clear how the scooter according to the present invention may be produced on a large scale at a decidedly low cost, while ensuring an optimum performance along winding or undulating roads and being unusually practical to use.

The invention claimed is:

1. An electric propulsion unit and torque transmission group for operating a rear wheel of an electric scooter with a step-through body and with an upright sitting portion, said electric propulsion unit comprising:
at least one synchronous electric motor, wherein said synchronous electric motor comprises an internal stator and an external rotor with a cup-shaped form rotating on a fixed shaft rigidly connected to the stator,
the motor being designed to be installed in a barycentric position with respect to the scooter substantially at the base of the upright sitting portion with the fixed shaft transverse to the longitudinal axis of the scooter, and
said transmission group comprising at least one first and one second reduction stage formed with a belt-and-pulley transmission,
said transmission group further comprising a support sliding in said casing for an intermediate shaft inserted between said first and second reduction stages, so as to allow relative tensioning of the transmission belts.

2. The electric propulsion unit and torque transmission group according to claim 1, wherein said transmission is formed with toothed pulleys and belts.

3. The electric propulsion unit and torque transmission group according to claim 1, wherein a heat dissipator forming an axial extension of the fixed drive shaft is associated with the stator of the electric motor.

4. The electric propulsion unit and torque transmission group according to claim 1, wherein the synchronous motor is of the brushless type driven by means of an inverter.

5. The electric propulsion unit and torque transmission group according to claim 1, wherein said electric propulsion unit comprises a battery housing compartment which can be integrated in the upright sitting portion of the scooter.

6. The electric propulsion unit and torque transmission group according to claim 5, wherein at least two structurally independent rechargeable battery packs are housed inside said compartment.

7. The electric propulsion unit and torque transmission group according to claim 5, wherein said batteries are removable and provided with battery charger and current plug connector for rapid connection to an electric power supply network.

8. The electric propulsion unit and torque transmission group according to claim 5, wherein each battery pack is singly removable for external recharging.

9. A two-wheel electric scooter comprising an electric propulsion unit and torque transmission group according to claim 1.

10. An electric propulsion unit and torque transmission group for operating a rear wheel of an electric scooter with a step-through body and with an upright sitting portion, said electric propulsion unit comprising:
- at least one synchronous electric motor, wherein said synchronous electric motor comprises an internal stator and an external rotor with a cup-shaped form rotating on a fixed shaft rigidly connected to the stator, the motor being designed to be installed in a barycentric position with respect to the scooter substantially at the base of the upright sitting portion with the fixed shaft transverse to the longitudinal axis of the scooter, and
- said transmission group comprising at least one first and one second reduction stage, wherein
- said propulsion group comprises a second synchronous electric motor which can be selectively coupled to the transmission group by means of a mechanism comprising a free wheel.

* * * * *